Dec. 20, 1938.  C. C. FARMER  2,141,149
PISTON LUBRICATING DEVICE
Filed Feb. 19, 1936
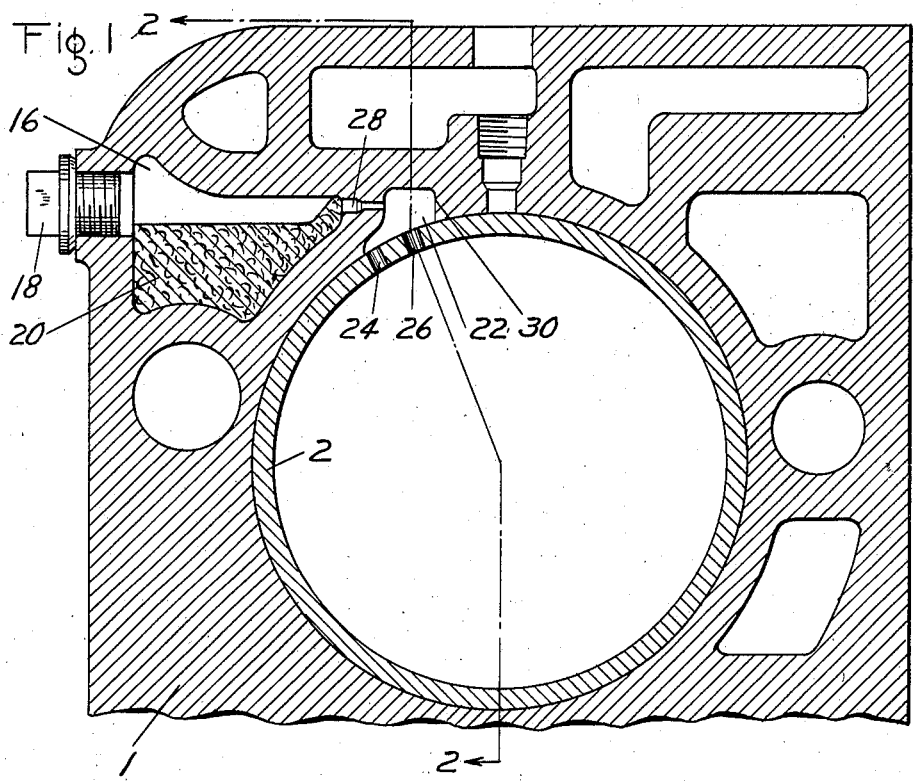
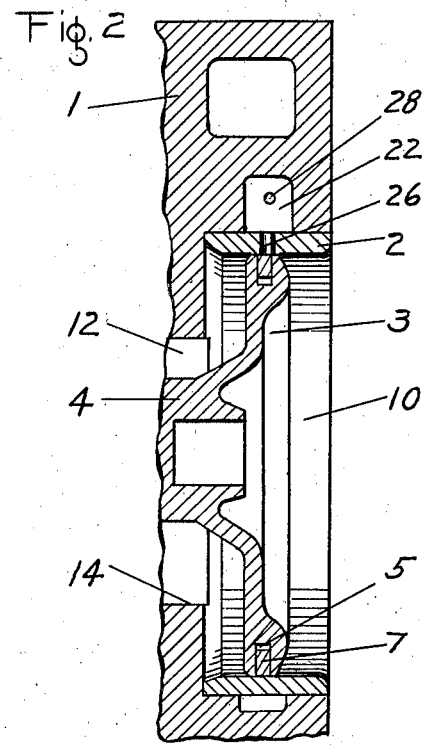
INVENTOR
CLYDE C. FARMER
BY *Wm. M. Cady*
ATTORNEY Patented Dec. 20, 1938

2,141,149

UNITED STATES PATENT OFFICE 2,141,149

PISTON LUBRICATING DEVICE

Clyde C. Farmer, Pittsburgh, Pa., assignor to The Westinghouse Air Brake Company, Wilmerding, Pa., a corporation of Pennsylvania Application February 19, 1936, Serial No. 64,623

15 Claims. (Cl. 184—18)

This invention relates to a brake controlling valve device and more particularly to a brake controlling valve device incorporating means for supplying lubricant to portions of the valve device to reduce the friction present on relative movement of these portions.

It is an object of this invention to provide lubricating means of the type described and which operates to supply lubricant only in limited quantities and only to the surfaces it is desired to have lubricated.

A further object of the invention is to provide lubricating means of the type described which operates in response to variations in the pressure of the fluid in portions of the valve device to be lubricated.

A further object of the invention is to provide lubricating means of the type described and having a lubricant reservoir from which lubricant may be supplied, and incorporating means to restrict the velocity of flow of the lubricant supplied from this reservoir and thereby prevent splashing of the lubricant to portions of the valve device other than the portions which it is desired to have lubricated.

Another object of the invention is to provide an improved brake controlling valve device incorporating means to supply lubricant to the piston and piston bushing employed therein so as to keep these members properly lubricated and thereby keep the friction between these members at a substantially uniform, relatively low value which will not interfere with the intended operation of the valve device.

A further object of the invention is to provide an improved brake controlling valve device.

Other objects of the invention and features of novelty will be apparent from the following description taken in connection with the accompanying drawing, in which—

Fig. 1 is a sectional view of a brake controlling valve device embodying this invention, and Fig. 2 is a sectional view taken substantially along the line 2—2 of Fig. 1.

Referring to the drawing I have illustrated therein a portion of a brake controlling valve device incorporating this invention. Only such portions of the valve device are illustrated and described in this application, however, as are essential to the understanding of this invention. The complete valve device is disclosed and claimed in my U. S. Patent No. 2,031,213, granted February 18, 1936.

This invention is directed particularly to means for supplying lubricant to the piston, the piston packing ring and to the piston bushing of the emergency section of the valve device shown in the above-identified patent, but it should be understood that the lubricating means provided by this invention may be employed with other types of brake controlling valve devices.

The brake controlling valve device illustrated in the drawing comprises a body 1, which may be constructed of any suitable material, such as cast iron, and is provided with a bore opening on one face of the body. A bushing 2, which may be formed of any suitable material, such as brass or moulded plastic composition, is pressed into the bore in the body 1.

A piston 3 having a stem 4 formed integral therewith is mounted in the bore in the bushing 2. The piston 3 is formed of a suitable material, such as brass, and has a groove 5 cut in the periphery thereof in which is positioned a packing ring 7, which is formed of a suitable material, such as brass, and is pressed into engagement with the inner face of the bushing 2 by the inherent resiliency of the material of which it is constructed.

The piston 3 is subject on one face to the pressure of the fluid in a chamber 10, which when the brake controlling valve device is in service communicates with the brake pipe. The piston 3 is subject on its other face to the pressure of the fluid in a slide valve chamber 12 which contains a slide valve, not shown, which is moved upon a seat indicated at 14 by means of the piston stem 4.

The piston 3 is reciprocable in the bore in the bushing 2 in response to variations in the pressure of the fluid in the chamber 10, and controls the supply and release of fluid under pressure to and from the valve chamber 12. The piston 3 is movable between a normal release position, which is the position in which it is shown in Fig. 2 of the drawing, and an application position in which a face of the piston engages a gasket secured against the right hand face of the body of the valve device as this device is shown in Fig. 2 of the drawing.

The body 1 has a chamber 16 formed therein at one side of the bore in which the bushing 2 is located and adjacent the upper portion of this bore. The chamber 16 is adapted to contain a quantity of lubricant, and an opening through which suitable lubricant in liquid form may be supplied to the chamber 16 is closed by means of a threaded plug 18.

The chamber 16 has positioned therein a quantity of fibrous material, such as curled hair indicated at 20, which is adapted to absorb a quantity of lubricant and to transfer it from the lowermost portions of the chamber 16 to the upper portions thereof by capillary action.

The lubricant chamber 16 is supplied with only enough lubricant to saturate the fibrous material 20, leaving an open chamber above the fibrous material. The opening in the wall of the chamber 16 which is closed by the plug 18 is so located as to prevent a greater quantity of lubricant being added to this chamber.

The lubricant chamber 16 is preferably proportioned so as to be large enough to contain a quantity of lubricant sufficient to last for a considerable period of time. This period may be at least as long as the intervals at which the valve devices are removed for inspection and cleaning so that the replenishing of the lubricant supply may be cared for at the same time.

The body 1 has formed therein adjacent the lubricant chamber 16 an expansion chamber 22, one wall of which is formed by the bushing 2. The expansion chamber 22 is of irregular shape and the lower wall of this chamber communicates with the inner face of the bushing 2 by way of ports 24 and 26 through the bushing 2.

The ports 24 and 26 are of relatively large flow capacity and are located in the bushing 2 so as to be substantially in the plane of the piston packing ring 7 when the piston 3 is in the release position as shown in Fig. 2 of the drawing.

The expansion chamber 22 communicates with the lubricant chamber 16 at a point vertically above the lowermost portions of the lubricant chamber 16 by way of a passage 28 of restricted flow capacity. The flow capacity of the passage 28 is preferably substantially less than the combined flow capacities of the passages 24 and 26.

As shown in the drawing the passage 28 is substantially straight throughout its entire length and is arranged so that fluid flowing through the passage is directed at a given area indicated at 30 on the wall of the chamber 22. The area 30 is spaced from the portion of the wall of the chamber 22 through which the passages 24 and 26 extend.

The fibrous material 20 in the lubricant chamber 16 is arranged in this chamber so as to cover the end of the passage 28 to a limited depth.

In operation, when the piston 3 is in the normal release position, as shown in Fig. 2 of the drawing, a passage, not shown, is opened between the chamber 10, which communicates with the brake pipe, and the slide valve chamber 12 so that fluid under pressure from the chamber 10 may flow to the slide valve chamber 12.

In addition, fluid under pressure supplied to the chamber 10, and to the slide valve chamber 12, will flow at a slow rate past the periphery of the piston 3 and past the packing ring 7 to the passages 24 and 26 through the bushing 2, and will flow through these passages to the expansion chamber 22.

Fluid supplied to the expansion chamber 22 flows therefrom by way of the restricted passage 28 to the upper portions of the lubricant chamber 16 and increases the pressure of the fluid in the lubricant chamber.

At this time the fibrous material 20 in the lubricant chamber 16 is saturated with lubricant which has been supplied to this chamber, and the lubricant is carried by capillary action to the portion of the fibrous material adjacent the upper portion of the lubricant chamber, and particularly to the portion of the fibrous material which covers the end of the restricted passage 28.

On a reduction in the pressure of the fluid in the brake pipe at an emergency rate there will be a corresponding reduction in the pressure of the fluid in the chamber 10 on the face of the piston 3 and the piston will be moved by the fluid under pressure in the slide valve chamber 12 to the application position.

On this movement of the piston 3 the communication between the chamber 10 on one face of the piston and the slide valve chamber 12 on the opposite face of the piston is closed, and fluid under pressure is released from the slide valve chamber 12 by means, not shown, operated by the piston stem 4. In addition, on this movement of the piston 3 the ports 24 and 26 are opened to the slide valve chamber 12.

On the reduction in the pressure of the fluid in the slide valve chamber 12 there is a corresponding reduction in the pressure of the fluid in the expansion chamber 22 as fluid may flow from this chamber to the slide valve chamber at a rapid rate through the ports 24 and 26.

On this reduction in the pressure of fluid in the expansion chamber 22 the fluid under pressure in the upper portion of the lubricant chamber 16 flows through the restricted passage 28 to the expansion chamber 22, and as this fluid passes through the portion of the fibrous material 20 which covers the end of the passage 28 it picks up a small quantity of lubricant from the lubricant which is present on this portion of the fibrous material and carries it through the restricted passage 28.

As the passage 28 is of relatively small flow capacity, and as there is a substantial difference in the pressure of the fluid in the lubricant chamber 16 and in the expansion chamber 22, the velocity of flow of fluid through the passage 28 will be relatively high and this stream, both the gases and the minute particles of lubricant carried thereby, will be carried across the expansion chamber 22 and will impinge upon the area 30 of the wall of the chamber 22. This will deflect the fluid and will cause the particles of lubricant to be deposited on the area 30 of the wall of the chamber 22.

The lubricant which is deposited upon the area indicated at 30 on the wall of the chamber 22 will gradually flow by gravity down this wall to the exterior face of the bushing 2, and will flow also by gravity across the face of this bushing to the ports 24 and 26 through which it will flow to the inner face of the bushing 2.

The time required for the lubricant to flow from the area at which it is deposited upon the wall of the expansion chamber 22 across this wall and across the face of the bushing 2 is such that the piston 3 in normal operation of the brake controlling valve device will have been returned to the release position, which is the position in which it is shown in Fig. 2 of the drawing, and in this position the piston packing ring 7 is in alignment with the inner ends of the ports 24 and 26.

As a result, therefore, the lubricant which flows through the ports 24 and 26 will be deposited upon the external face of the piston packing ring 7 and it will distribute itself, both by gravity and by capillary action, around the circumference of the packing ring and also around the periphery of the piston 3.

On the next operation of the piston 3 of the brake controlling valve device the lubricant which is deposited thereon will be distributed across the entire face of the bushing 2 so as to lubricate this face.

The return of the piston 3 from the application position to the release position will be accompanied by an increase in the pressure of the fluid in the chamber 10 on the face of the piston 3, and fluid from this chamber will flow past the periphery of the piston 3 and the packing ring 7 to the ports 24 and 26 and then to the expansion chamber 22 from which it flows by way of the restricted passage 28 to the lubricant chamber 16, thereby restoring the pressure of the fluid in this chamber. On the next reduction in pressure in the brake pipe at an emergency rate the lubricating apparatus will operate as described in detail above to again supply a limited amount of lubricant to the expansion chamber 22 from which it flows through the ports 24 and 26 to the face of the piston 3.

It will be seen that the lubricating means provided by this invention provides means to supply a quantity of lubricant at periodic intervals to lubricate the piston and piston packing ring which are employed in the brake controlling valve device.

It will be seen that this lubricant flows from the lubricant chamber or reservoir at a relatively rapid rate but that the velocity of flow of the lubricant is reduced when it reaches the expansion chamber 22 and that thereafter its rate of movement is very slow. This prevents lubricant being carried to portions of the brake controlling valve device, such as the slide valve seat 14, which it is not desired to have lubricated.

It will be seen, therefore, that this lubricating means provides means to supply lubricant to the portions of the brake controlling valve device which it is desired to have lubricated, and at the same time limit the supply so that the lubricant is not carried to other portions of the brake controlling valve device where it might interfere with the proper operation of the valve device.

While one embodiment of the improved brake controlling valve device provided with the lubricating means provided by this invention has been illustrated and described in detail, it should be understood that the invention is not limited to these details of construction and that numerous changes and modifications may be made without departing from the scope of the following claims.

Having now described my invention, what I claim as new and desire to secure by Letters Patent, is:

1. In a brake controlling valve device, in combination, a body having a bore therein, a piston reciprocable in said bore, the body having a chamber associated therewith, the chamber having associated therewith a communication leading from the lower surface of the chamber to the face of the bore adjacent the uppermost portion thereof, the body having another chamber associated therewith and adapted to contain a quantity of lubricant, said lubricant chamber communicating with the first named chamber by way of a passage of substantially less rapid flow capacity than that of said communication, the valve device being adapted to have fluid under pressure both supplied to and released from the area at the face of the piston by way of a communication independent of said chambers.

2. In a brake controlling valve device, in combination, a body having a bore therein, a piston reciprocable in said bore, the body having a chamber associated therewith, the chamber having associated therewith a communication leading from the lower surface of the chamber to the face of the bore adjacent the uppermost portion thereof, the body having another chamber associated therewith and adapted to contain a quantity of lubricant, said lubricant chamber communicating with the first named chamber by way of a passage of substantially less rapid flow capacity than that of said communication, the valve device being adapted to have fluid under pressure both supplied to and released from the area at the face of the piston by way of a communication independent of said chambers and means controlled by said piston for supplying fluid under pressure to and for releasing fluid under pressure from said first-named chamber.

3. In a brake controlling valve device, in combination, a body having a bore therein, a piston reciprocable in said bore, the body having a chamber associated therewith and adapted to contain a quantity of lubricant, a passage communicating with the lubricant chamber at a point above the lowermost portion thereof and with an expansion chamber associated with the body of the valve device, means for carrying lubricant by capillary action from the lower portions of the lubricant chamber to said passage, and a communication by which lubricant may flow by gravity from said expansion chamber to a region on the face of the said bore.

4. In a brake controlling valve device, in combination, a body having a bore therein, a piston reciprocable in said bore, the body having a chamber associated therewith and adapted to contain a quantity of lubricant, a passage communicating with the lubricant chamber at a point above the lowermost portion thereof and with an expansion chamber associated with the body of the valve device, means for carrying lubricant by capillary action from the lower portions of the lubricant chamber to said passage, and a communication by which lubricant may flow by gravity from said expansion chamber to a region on the face of the said bore adjacent the uppermost portion thereof.

5. In a brake controlling valve device, in combination, a body having a bore therein, a piston reciprocable in said bore, the body having a chamber associated therewith and adapted to contain a quantity of lubricant, the body having an expansion chamber associated therewith, a communication through which lubricant may flow from the lubricant chamber to the expansion chamber, said communication directing the flow of lubricant against a given area on the face of the wall of the expansion chamber, and a passage through which lubricant may flow by gravity from said expansion chamber to a point on the face of the said bore, said passage communicating with said expansion chamber in a region vertically below said given area.

6. In a brake controlling valve device, in combination, a body having a bore therein, a piston reciprocable in said bore, the body having a chamber associated therewith and adapted to contain a quantity of lubricant, the body having an expansion chamber associated therewith, a communication through which lubricant may flow from the lubricant chamber to the expansion chamber, said communication directing the flow of lubricant against a given area on the face of the wall of the expansion chamber, and a passage through which lubricant may flow by gravity from said expansion chamber to a point on the face of the said bore, said passage communicating with said expansion chamber in a region vertically below said given area and communicating with said bore in a region adjacent the uppermost portion thereof.

7. In a brake controlling valve device, in combination, a body having a bore therein, a piston reciprocable in said bore, the body having a chamber associated therewith and adapted to contain a quantity of lubricant, the body having an expansion chamber associated therewith, a communication through which lubricant may flow from the lubricant chamber to the expansion chamber, said communication directing the flow of lubricant to the expansion chamber against a given area on the wall of the said expansion chamber, and means having a greater flow capacity than said communication through which lubricant may flow from said expansion chamber to a region of the face of the said bore, said means communicating with the expansion chamber in a region vertically below said given area.

8. In a brake controlling valve device, in combination, a body having a bore therein, a piston reciprocable in said bore, the body having a chamber associated therewith and adapted to contain a quantity of lubricant, the body having an expansion chamber associated therewith, a port through which lubricant may flow from the lubricant chamber to the expansion chamber, said port communicating with the lubricant chamber at a point above the lowermost portion thereof and directing the flow of lubricant to the expansion chamber against a given area on the wall of the said expansion chamber, means for carrying lubricant by capillary action from the lower portion of the lubricant chamber to said port, and means having a greater flow capacity than said port through which lubricant may flow from the expansion chamber to a point on the face of the said bore, said means communicating with the expansion chamber in a region vertically below said given area.

9. In a brake controlling valve device, in combination, a body having a bore therein, a piston reciprocable in said bore between a release position and an application position, the body having a chamber associated therewith and adapted to contain a quantity of lubricant, the body also having an expansion chamber associated therewith, a port communicating with said lubricant chamber and with the said expansion chamber, and a passage communicating with said expansion chamber and with a port in said bore located substantially in alignment with the face of the piston when the piston is in its release position, the valve device being adapted to have fluid under pressure both supplied to and released from the area at the face of the piston by way of a communication independent of said chambers.

10. In a brake controlling valve device, in combination, a body having a bore therein, a piston reciprocable in said bore between a release position and an application position, the body having a chamber associated therewith and adapted to contain a quantity of lubricant, the body also having an expansion chamber associated therewith, a port communicating with said lubricant chamber and with said expansion chamber, and means having a flow capacity greater than said port and communicating with said expansion chamber and with a port in said bore located substantially in alignment with the face of the piston when the piston is in its release position, the valve device being adapted to have fluid under pressure both supplied to and released from the area at the face of the piston by way of a communication independent of said chambers.

11. In a brake controlling valve device, in combination, a body having a bore therein, a piston reciprocable in said bore between a release position and an application position, the body having a chamber associated therewith and adapted to contain a quantity of lubricant, the body also having an expansion chamber associated therewith, a port communicating with said lubricant chamber at a point above the lowermost portions thereof and with said expansion chamber, and means having a flow capacity greater than said port and communicating with said expansion chamber and with a port in said bore substantially in alignment with the face of the piston when the piston is in its release position, the valve device being adapted to have fluid under pressure both supplied to and released from the area at the face of the piston by way of a communication independent of said chambers.

12. In a brake controlling valve device, in combination, a body having a bore therein, a piston reciprocable in said bore between a release position and an application position, the body having a chamber associated therewith and adapted to contain a quantity of lubricant, the body also having an expansion chamber associated therewith, a port communicating with said lubricant chamber and with said expansion chamber, said port being adapted to direct the flow of lubricant from the lubricating chamber to the expansion chamber against a given area on a wall of the expansion chamber, and a passage communicating with the expansion chamber in a region vertically below said given area and with a point in said bore located substantially in alignment with the face of the piston when the piston is in its release position.

13. In a brake controlling valve device, in combination, a body having a bore therein, a piston reciprocable in said bore between a release position and an application position, the body having a chamber associated therewith and adapted to contain a quantity of lubricant, the body also having an expansion chamber associated therewith, a port communicating with said lubricant chamber at a point above the lowermost portion thereof and with the expansion chamber, said port being arranged to direct the flow of lubricant from the lubricant chamber to the expansion chamber against a given area on the wall of the expansion chamber, means for carrying lubricant from the lower portion of the lubricant chamber to said port by capillary action, and means having a greater flow capacity than said port and communicating with the expansion chamber in a region vertically below said given area and with the bore at a point substantially in alignment with the piston when the piston is in its release position.

14. In a brake controlling valve device, in combination, a body having a bore therein, a piston reciprocable in said bore, a chamber containing a quantity of lubricant, an expansion chamber having a passage communicating with said bore and a restricted passage communicating with said lubricant chamber, and a material interposed in the path of flow of fluid from the lubricant chamber to the expansion chamber and supplied with lubricant from said lubricant chamber by capillary attraction, whereby fluid flowing from said lubricant chamber to said expansion chamber through said material carries lubricant from said material to said expansion chamber, the valve device being adapted to have fluid under pressure both supplied to and released from the area at the face of the piston by way of a communication independent of said chambers.

15. In a brake controlling valve device, in combination, a body having a bore therein, a piston reciprocable in said bore in response to variations in the pressure of the fluid in a piston chamber at the face thereof, the body having another chamber associated therewith, said other chamber having associated therewith a communication leading from the lower portion thereof to the face of the bore adjacent the uppermost portion thereof whereby fluid under pressure may flow between said other chamber and the chamber defined by said bore to thereby vary the pressure of the fluid in said other chamber, said body also having a lubricant chamber associated therewith adapted to contain a quantity of lubricant and to also contain fluid under pressure, a passage communicating with said lubricant chamber and with said other chamber whereby fluid may flow to said lubricant chamber on an increase in the pressure of the fluid in said other chamber and whereby fluid may flow from the lubricant chamber to said other chamber on a reduction in the pressure of the fluid in said other chamber to thereby transfer lubricant from the lubricant chamber to said other chamber from which it may flow by gravity to the face of said bore, said piston chamber having fluid under pressure both supplied thereto and released therefrom by way of a communication independent of said lubricant chamber and said other chamber.

CLYDE C. FARMER.